United States Patent [19]

Deeds

[11] 4,313,636
[45] Feb. 2, 1982

[54] FOLDING COVER FOR TRUCK BED

[76] Inventor: Larry B. Deeds, Rte. 1, Box 216, Rochelle, Tex. 76872

[21] Appl. No.: 3,493

[22] Filed: Jan. 15, 1979

[51] Int. Cl.³ .............................................. B60J 7/10
[52] U.S. Cl. ..................................... 296/100; 160/93
[58] Field of Search ................... 296/100, 137 B, 219, 296/220, 101; 160/187, 90, 93, 95, 97; 220/334

[56] References Cited

U.S. PATENT DOCUMENTS

| | | | |
|---|---|---|---|
| 3,300,265 | 1/1967 | Wilmer et al. | 220/334 X |
| 3,416,835 | 12/1968 | Ohle | 296/100 |
| 3,512,828 | 5/1970 | Craft | 296/27 X |
| 3,649,072 | 3/1972 | Cross | 296/220 X |
| 3,768,858 | 10/1973 | Boismier | 296/137 B |
| 3,833,255 | 9/1974 | Logue | 296/137 B |
| 3,986,749 | 10/1976 | Hull et al. | 296/100 X |

Primary Examiner—Joseph F. Peters, Jr.
Assistant Examiner—Norman L. Stack, Jr.
Attorney, Agent, or Firm—Lowe, King, Price & Becker

[57] ABSTRACT

A bed cover for a pickup truck comprises a plurality of horizontal, rigid panel sections supported on angle irons above the load supporting surface of the bed. The panel sections are coupled to each other through transversely extending hinges to enable the sections to pivot open for access to the bed. One of the panel sections is secured to the angle irons while enabling the remaining sections to pivot about their hinges. In one embodiment, only the panel section nearest the cabin is secured on the angle irons, enabling the remaining sections to fold into a storage position when not in use. In a second embodiment, only a center panel section is secured on the angle irons, enabling access to the pickup bed from either the cabin end or tail end of the bed.

13 Claims, 9 Drawing Figures

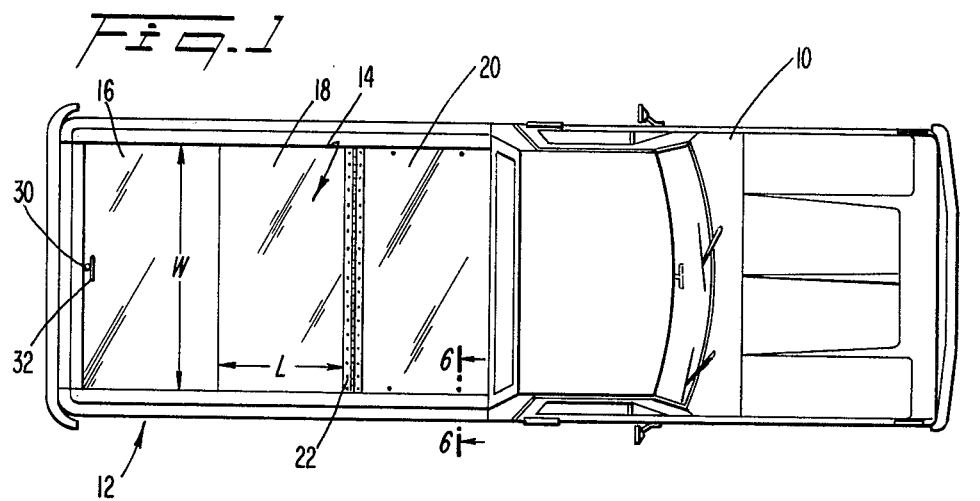
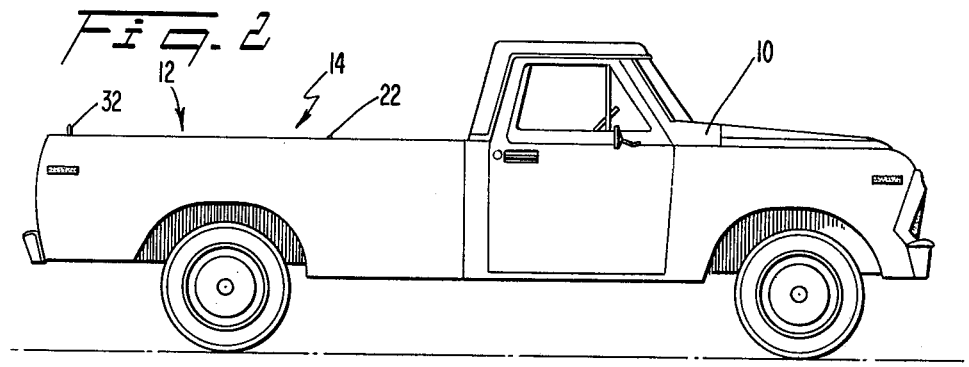
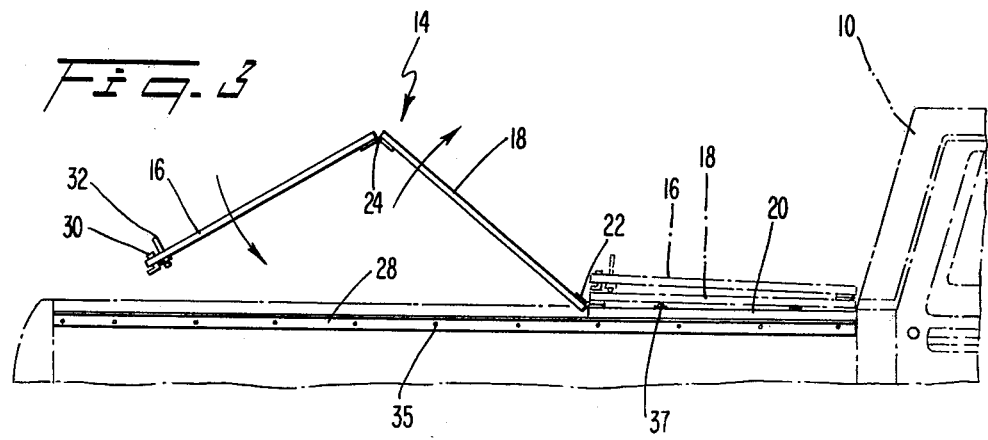

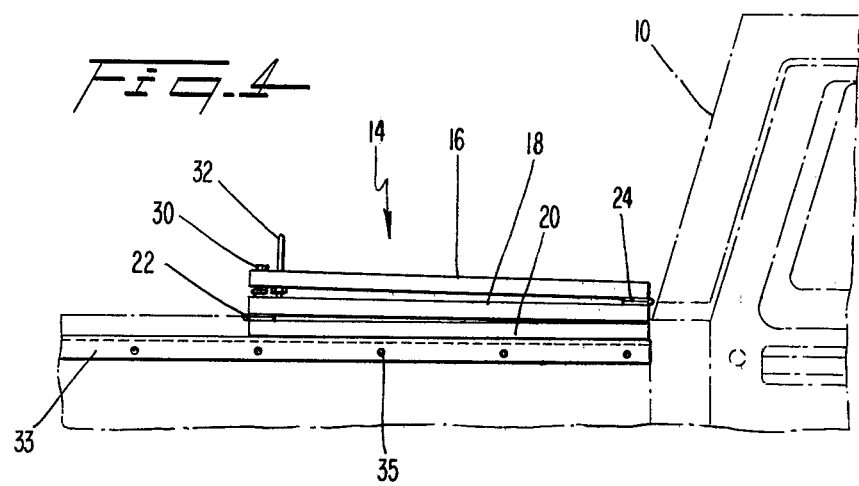
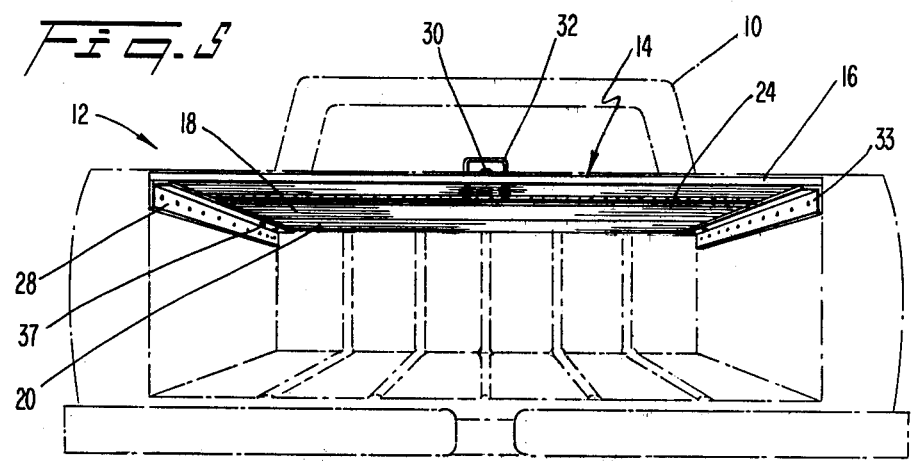
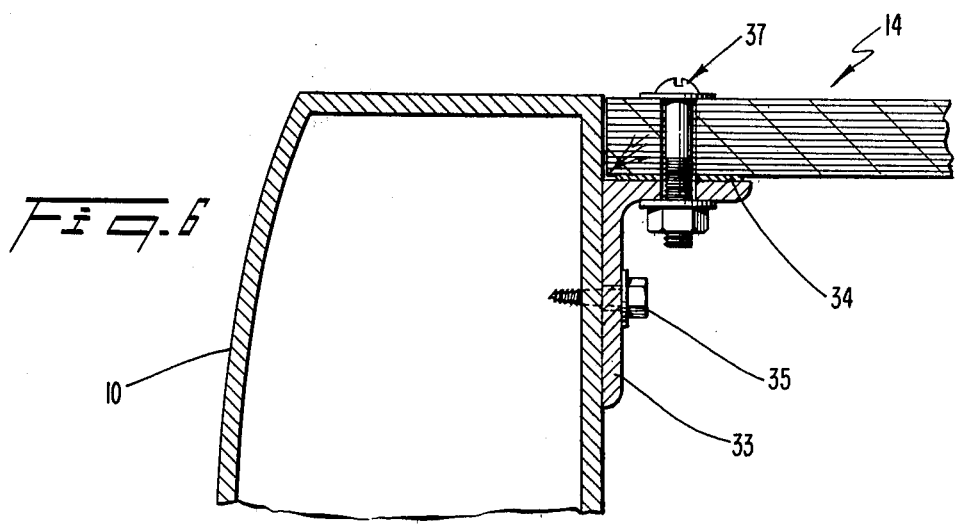

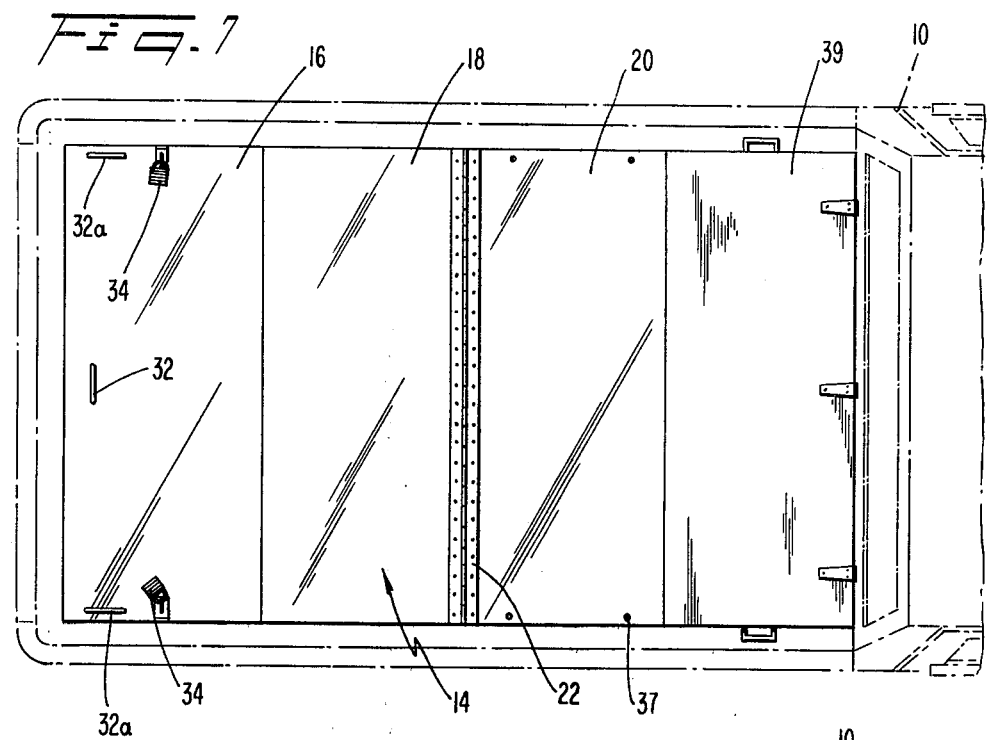
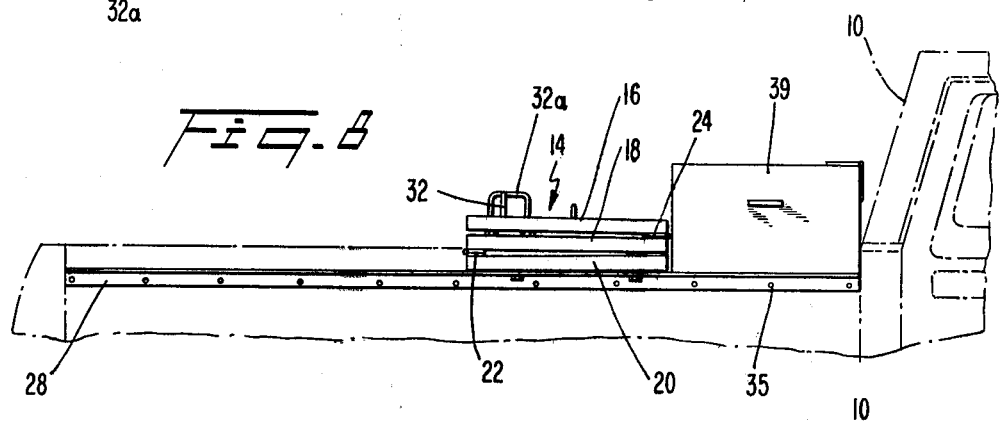
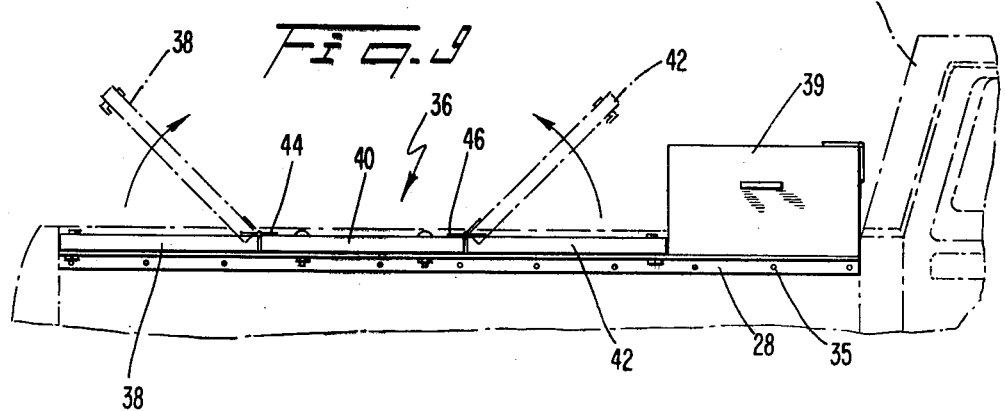

FOLDING COVER FOR TRUCK BED

TECHNICAL FIELD

The present invention relates generally to trunk bed covers, and more particularly, toward a pickup truck bed cover which is capable of being locked closed for covering the bed and providing a load carrying deck and being folded open into a storage position to provide access to the bed without removing the cover from the truck.

BACKGROUND ART

There is presently a trend toward using pickup trucks for both business and personal applications. For example, individuals are now using such trucks during business hours to haul merchandise or materials and are converting the truck to personal use, such as camping during evenings and on weekends. Because it is sometimes necessary to transport both business and personal cargo under cover, and because some articles such as tools or personal belongings are particularly susceptible to theft, there exists a need for covering the bed to protect its contents.

Pickup truck beds have typically been covered, in the prior art, by a tonneau type cover which is formed of cloth and has peripheral snaps that attach to corresponding snaps located along the sidewall of the bed. The tonneau type cover, however, although widely used, does not prevent access to the bed since it can be easily removed. Furthermore, the initial installation of the tonneau cover requires drilling of the sidewall for installation of the snaps, and after installation, is somewhat inconvenient to apply and remove from the bed of the truck.

One object of the present invention, therefore, is to provide a new and improved pickup truck bed cover.

Another object is to provide a pickup truck bed cover that protects the contents of the bed from weather and from theft.

Another object is to provide a pickup truck bed cover that enables the truck to be applicable alternatively, in business use for hauling cargo where protection from weather is required, and in personal use where theft protection of a type provided by a conventional automobile trunk is needed.

Another object is to provide a pickup truck bed cover that encloses the entire bed and folds open when not in use to prevent interference to access of the bed.

Still another object is to provide a pickup truck bed cover which is capable of enclosing the entire bed and opening to expose certain portions of the bed for access.

Yet another object is to provide a new and improved pickup truck bed cover that is installed without requiring drilling of holes in the exterior of the sidewall of the pickup truck bed.

U.S. Pat. No. 3,512,828 discloses a pickup bed cover that is rigid and functions as a load carrying deck. Access to the bed is made through a series of doors mounted in the deck. The doors are pivoted on longitudinal hinges so that they must be opened and closed from the sides of the truck; there is no convenient way to operate the doors from the rear of the bed. Also, in order to obtain access to a large portion of the bed or to store on the bed a large article that extends above the deck, the entire deck must be disassembled from the sidewall of the bed.

Another object of the invention, therefore, is to provide a new and improved, rigid, pickup bed cover having access openings that can be operated from the rear of the bed.

Another object is to provide a new and improved, rigid, pickup bed cover that enables access to a large portion of the bed for storage of articles extending above the cover, without requiring disassembly of the cover from the bed.

BRIEF DESCRIPTION

A cover for the bed of a pickup truck, in accordance with the invention, comprises a plurality of horizontal, rigid panel sections formed of plywood, aluminum, fiberglass or other suitable material. The panel sections are connected to each other through transverse hinges and each section has a width corresponding to the width of the bed. Together, the horizontal panel sections define a deck or cover large enough to totally enclose and prevent access to the bed.

The panel sections are supported above the load bearing surface of the truck bed by a set of angle irons secured to the sidewall. A rubber gasket is positioned between the angle irons and panel sections to cushion the sections and form a water resistant seal. The rigid cover in the closed position forms a horizontal deck which is capable of supporting cargo.

Of particular importance, within the spirit of this invention, any of the rigid panel sections are capable of being secured to the supporting angle irons. Thus, any of the sections can be locked into the horizontal, closed positions with the remaining sections being manually pivoted about the supporting hinges for opening the cover to access the bed. In accordance with one embodiment, for example, the cover comprises three panel sections that are hinged together, with only the section nearest the cabin of the truck, being bolted to the angle irons. The hinges interconnecting the three panels are arranged to pivot oppositely relative to each other to enable the second and third panel sections to fold or collapse toward the cabin for stacking on the first section when not in use. In a second embodiment, only the middle one of three panel sections is bolted to the angle irons enabling access to the bed through the first and third panel sections. In each embodiment, the free panel sections are selectively locked closed by padlocks or other locking mechanisms. Also in each embodiment, access to the bed is available from the rear of the truck.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a top view of a pickup truck having a bed cover, in accordance with one embodiment of my invention;

FIG. 2 is a side view of the pickup truck of FIG. 1;

FIG. 3 is a cross sectional side view of the pickup truck bed showing the bed cover being folded into a storage position behind the cabin;

FIG. 4 is a side view of the bed showing the cover in the storage position;

FIG. 5 is a rear view of the pickup truck bed showing installation of the bed cover;

FIG. 6 is a cross sectional side view of a sidewall of the pickup truck bed showing the cover mounting hardware;

FIG. 7 is a top view of a pickup truck bed having a built in tool box and bed cover in accordance with the invention;

FIG. 8 is a side view of the bed of FIG. 7 showing the bed cover folded into a storage position; and FIG. 9 is a side view of a pickup truck bed having a bed cover in accordance with another embodiment of the invention.

BEST MODE FOR CARRYING OUT THE INVENTION

Referring to FIGS. 1 and 2, a standard pickup truck 10 having a bed 12 is provided with a convertible bed cover, in accordance with the invention, designated generally by the numeral 14. The cover 14 is formed of first, second and third horizontal, rigid panel sections 16, 18 and 20, constructed, for example, of plywood, fiberboard, aluminum or other light weight metal, fiberglass or plastic. The panel sections 16, 18 and 20 may be finished with varnish or shellac or coated with vinyl, plastic or padding, depending upon appearance requirements. Each of the panels 16, 18 and 20 has a width W corresponding to the width of the bed. The length L of each of the sections 16, 18 and 20 is equal to the length of the bed divided by the number of panel sections to fully enclose the bed, as shown in FIG. 1.

The panel sections 16, 18 and 20 are connected together by conventional hinges 22 and 24 (see FIG. 3). Hinge 22 interconnects panel sections 18 and 20 and is fastened to the upper surfaces of those panels to enable the middle panel 18 to pivot clockwise about panel 20 during opening, as shown in FIG. 3. On the other hand, hinge 24 interconnects panel sections 16 and 18 and is fastened to the lower surfaces of those panels to enable counterclockwise pivoting of panel 16 about panel 18 during opening, as shown in FIG. 3.

Referring to FIG. 5, the cover 14 is mounted above the load bearing surface 26 of the pickup truck bed 12 by a pair of angle irons 28, 30 attached to opposite sidewalls of the bed by screws 32 (FIG. 6) or by weldments. A rubber gasket 34 is mounted on each angle iron 28, 30 to cushion the bed cover 14 and to provide a water resistant seal.

Only the third panel section 20 nearest the cabin of the pickup truck is secured to angle irons 28 and 30 by nut and bolt assemblies 37 (FIG. 6). The remaining panel sections 16 and 18 are free to pivot, being coupled to the bed only at hinge 22. Thus, in a closed position, the panel sections 16, 18 and 20 are horizontal, resting on angle irons 28, 30 to enclose the pickup bed 12, as shown in FIGS. 1 and 5. The cover 14 is locked closed by a turret type or any other suitable type locking member or latch 30. Cover 14 is opened to provide access to the bed by using handle 32 on panel 16 to pivot center panel section 18 clockwise about hinge 22 as shown in FIG. 3. If it is desired to maintain the cover 14 open, panel sections 16 and 18 are folded by continuing to pivot the center section 18 clockwise while pivoting the hand-held section 16 counterclockwise to collapse the cover for stacking (see dotted lines in FIG. 3) into the storage position shown in FIG. 4.

Referring to FIGS. 7 and 8, a modification of the embodiment of the invention of FIG. 1 to accommodate a pickup truck having a built-in tool box 32, is shown. The cover 14 is displaced rearwardly in the pickup truck bed 12 to accommodate the tool box 32. The cover 14 is shown closed in FIG. 7, with panel section 16 being locked to upstanding U-members extending upwardly from the angle irons 28, 30 beneath the sections by padlocks 34. By removing the padlocks 34, the cover 14 can be pivoted into the storage position, shown in FIG. 8, in the manner described above in connection with FIGS. 3 and 4.

It is to be noted that in the closed position (FIG. 7), cover 14 prevents any access to the pickup truck bed by unauthorized personnel, and also protects the cargo from weather. It is also to be noted that the bed 14, being rigid, is capable of supporting an additional load. In the event that a single, relatively tall item must be carried, for example, the item can be located on the load bearing surface 26 of the bed and permitted to extend upwardly through the cover 14 at open panel section 16. Other cargo could be mounted on the load bearing surface 26 of the bed beneath sections 18 and 20 with additional, lighter cargo being positioned on the sections 18 and 20. It is further to be noted that access to the pickup bed 12 can be made from the rear of the truck through panel section 16 (handle 32) or from the sides of the truck (handle 32a).

Referring to FIG. 9, another embodiment of the bed cover, in accordance with the invention, is shown. The bed cover, identified generally by 36, comprises first, second and third panel sections 38, 40 and 42 corresponding, respectively, to panel sections 16, 18 and 20, above. Panels 38 and 40 are interconnected by a hinge 44 whereas the panels 40 and 42 are interconnected by a hinge 46. The hinges 44 and 46 are both attached to the upper surfaces of the panel sections 38, 40 and 42 and are adapted to enable panel 42 to pivot counterclockwise about the center panel 40 and to enable panel section 38 to pivot clockwise about the center panel. Only the center panel section 40 is secured to angle irons 28, 30 by nut and bolt assemblies 37.

The bed cover 36 enables access to the pickup bed 12 through either panel section 38 or panel section 42, as shown, and has the advantage of being conveniently loadable from the area of tool box 32 or from the rear of the pickup truck. The panel sections 28 and 42 are lockable in the horizontal, closed position by locking means (not shown) similar to padlocks 34 in FIG. 7 or latch 30 in FIG. 3.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein. For example, the number of panel sections constituting the bed cover is obviously a matter of design as are the materials forming its construction.

I claim:

1. A cover for the bed of a pickup truck, the cover comprising a plurality of horizontal, rigid panel sections; means for supporting said panel sections above a load bearing surface of said bed; at least one of said panel sections being fixedly attached in stationary position on said supporting means above the load bearing surface, said fixed panel section restraining said plurality of panel sections against sliding thereof on said supporting means in a manner to reduce noise and minimize vibration and wear of the cover; transverse hinge means for interconnecting adjacent ones of said panel sections and enabling pivoting of sections about said fixed panel section or sections along axes perpendicular to side walls of said bed between closed horizontal positions and open positions, and being further operable to prevent sliding movement of said panels and means for releasably locking closed at least one of said pivotable panel sections.

2. The bed cover of claim 1, wherein each of said panel sections has a width corresponding to the width of said bed.

3. The bed cover of claim 2, wherein said panel sections, when closed, have a composite area large enough to enclose said bed.

4. The bed cover of claim 3, wherein said hinge means includes a hinge located between and connected to each pair of adjacent panel sections, successive ones of said hinges pivoting, respectively, in opposite directions.

5. The bed cover of claim 3, wherein said hinge means includes a hinge located between and connected to each pair of adjacent panel sections, successive ones of said hinges pivoting, respectively, in common directions.

6. The bed cover of claim 4 or claim 5, wherein each one of said hinges extends along the entire width of said panel sections.

7. The bed cover of claim 1, wherein said supporting means includes angle irons secured to the sidewalls of said bed, said panel sections being supported on the angle irons.

8. The bed cover of claim 7, including a gasket positioned on said angle irons to cushion and form a seal for said panel sections.

9. The bed cover of claim 8, wherein said locking means includes means for releasably securing at least one of said panel sections to said angle irons.

10. The bed cover of claim 1, including first, second and third panel sections, said second section being located between said first and third sections, said third section being located nearest a cabin of said truck, and said securing means including means for securing said second panel section to said supporting means.

11. The bed cover of claim 10, wherein said hinge means includes a first hinge between said first and second panel sections and a second hinge between said second and third panel sections, said first and second hinges enabling outward pivoting of said first and third panel sections about said second panel section.

12. The bed cover of claim 1, including first, second and third panel sections, said second section being positioned between said first and third sections and said third section being positioned nearest a cabin of said truck, and said securing means including means for securing said third section to said supporting means, said first and second sections being pivotable for storage into a stack located behind said cabin.

13. The bed cover of claim 11 or claim 12, wherein a tool box is positioned in said bed between said third panel section and said cabin.

* * * * *